(12) United States Patent
Williams et al.

(45) Date of Patent: Jul. 20, 2021
(10) Patent No.: US 11,070,430 B2

(54) PERSONA/INDIVIDUAL BASED ACTIONS BASED ON COMMUNITY SPECIFIC TRIGGER

(71) Applicant: AT&T Intellectual Property I, L.P., Atlanta, GA (US)

(72) Inventors: Robert F. Williams, Garland, TX (US); Eric Zavesky, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/113,355

(22) Filed: Aug. 27, 2018

(65) Prior Publication Data
US 2020/0067776 A1 Feb. 27, 2020

(51) Int. Cl.
*H04L 12/24* (2006.01)
*H04L 29/08* (2006.01)

(52) U.S. Cl.
CPC .......... *H04L 41/0876* (2013.01); *H04L 67/10* (2013.01)

(58) Field of Classification Search
CPC ............................ H04L 41/0876; H04L 67/10
See application file for complete search history.

(56) References Cited

U.S. PATENT DOCUMENTS

| | | | |
|---|---|---|---|
| 6,732,364 B1 | 5/2004 | Bhaskaran et al. | |
| 7,444,315 B2 | 10/2008 | Wu | |
| 7,849,136 B2 | 12/2010 | Cho et al. | |
| 7,962,559 B2 | 6/2011 | Klassen et al. | |
| 8,151,103 B2 | 4/2012 | Jackson | |
| 8,185,643 B2 | 5/2012 | McMullen et al. | |
| 8,819,536 B1 | 8/2014 | Lucovsky et al. | |
| 8,843,481 B1 | 9/2014 | Xu | |
| 9,760,955 B2 | 9/2017 | Soni | |
| 9,813,556 B2 | 11/2017 | Sharpe et al. | |
| 9,852,208 B2 | 12/2017 | Chari et al. | |
| 2005/0050151 A1 | 3/2005 | Mitchell et al. | |
| 2008/0019269 A1* | 1/2008 | Bisdikian ......... | G08G 1/096844 370/230 |

(Continued)

FOREIGN PATENT DOCUMENTS

WO    WO 2007/058669 A1    5/2007

OTHER PUBLICATIONS

Song et al.; "User Group-based Workload Analysis and Modelling"; IEEE int'l Symposium—Cluster Computing and the Grid; vol. 2; 2005; 12 pages.

(Continued)

*Primary Examiner* — Christopher B Robinson
(74) *Attorney, Agent, or Firm* — BakerHostetler (57) ABSTRACT

Systems and methods herein spawn action sets for networked communities which are executed based on detected triggers. A method that spawns action sets can include selecting a community including member devices. The member devices are associated with a distributed job. The method can also include identifying a trigger related to the distributed job and spawning an automated action set related to the trigger. The automated action set includes at least one of automated action by the member devices or automated action by a remote device communicatively coupled to at least one of the member devices.

20 Claims, 7 Drawing Sheets

(56) References Cited

U.S. PATENT DOCUMENTS

| | | | |
|---|---|---|---|
| 2008/0082657 A1* | 4/2008 | Hart | H04L 41/0681 709/224 |
| 2008/0249987 A1 | 10/2008 | Ogasawara | |
| 2009/0319537 A1* | 12/2009 | Westerfeld | G06Q 10/10 |
| 2010/0057505 A1 | 3/2010 | Doyle et al. | |
| 2010/0138007 A1 | 6/2010 | Clark et al. | |
| 2010/0241599 A1 | 9/2010 | Yu et al. | |
| 2012/0078906 A1 | 3/2012 | Anand et al. | |
| 2013/0179895 A1* | 7/2013 | Calder | G06F 9/5077 718/104 |
| 2014/0130057 A1* | 5/2014 | Fu | H04L 67/1002 718/104 |
| 2015/0095231 A1 | 4/2015 | Harold et al. | |
| 2015/0143363 A1* | 5/2015 | Gombert | G06F 9/5083 718/1 |
| 2015/0349976 A1 | 12/2015 | Toutain et al. | |
| 2015/0370603 A1* | 12/2015 | Fuller | G06F 9/4881 718/104 |
| 2016/0105305 A1 | 4/2016 | Pignataro et al. | |
| 2016/0119424 A1* | 4/2016 | Kane | H04L 67/10 709/203 |
| 2016/0225259 A1* | 8/2016 | Harris | H04W 4/029 |
| 2017/0046127 A1 | 2/2017 | Fletcher et al. | |
| 2018/0081716 A1* | 3/2018 | Yu | H04L 41/12 |
| 2018/0309592 A1* | 10/2018 | Stolfus | G08G 1/202 |

OTHER PUBLICATIONS

Ur et al.; "Practical Trigger-Action Programming in the Smart Home"; ACM Proceedings of the SIGCHI Conf. on Human Factors in Computing Systems; 2014; 10 pages.

Merali et al.; "Knowledge Capture and Utilization in Virtual Communities"; K-CAP; Jan. 2001; p. 92-99.

Papageorgiou et al.; "A Collaboration Pattern Model for Virtual Organisations" Leveraging Knowledge for Innovation in Collaborative Networks; 2009; p. 61-68.

* cited by examiner

PERSONA/INDIVIDUAL BASED ACTIONS BASED ON COMMUNITY SPECIFIC TRIGGER

TECHNICAL FIELD

The present disclosure relates generally to systems and methods for managing communities in networks and more particularly for spawning community actions in response to triggers communicated over networks.

BACKGROUND

Computer automation is becoming more prolific, driven in part by the increasing capabilities of networks, machine learning, and high-resolution interconnectivity enabled by the Internet of Things (IoT). Some of these advances are also enabling the creation, management, and dissolution of smart "communities" which associate various people, their network profiles (e.g., personas), and the devices they use. For example, AT&T is developing "data communities" within the architecture of its Network 3.0 (Indigo) evolution.

While communities can be created based on a variety of parameters, management of the communities (generally and as handled for particular use cases) presents a confusing variety of possibilities and options. Conventional techniques typically rely on manual action, e.g., to authorize access or execution by a community member or to add or remove members from a community, or do not utilize communities at all. Given the emphasis on automation in modern networks, it would be beneficial to use communities or information derived therefrom to automate, streamline, and expedite actions in a network.

SUMMARY

The needs existing in the field are addressed by the present disclosure, which relates to systems, methods and computer useable media for managing triggers and related action sets in communities.

In one embodiment, a method comprises selecting a community including member devices. The member devices are associated with a distributed job. The method also includes identifying a trigger related to the distributed job and spawning an automated action set related to the trigger. The automated action set includes at least one of automated action by the member devices or automated action by a remote device communicatively coupled to at least one of the member devices. The method also includes executing, in response to the trigger, the automated action set.

Another embodiment includes a system for managing community action sets based on triggers. The system includes a community identification component configured to select a community including member devices. The member devices are associated with a distributed job. The system also includes a trigger component configured to identify a trigger related to the distributed job. The system also includes an automation component configured to spawn an automated action set related to the trigger. The automated action set includes at least one of automated action by the member devices or automated action by a remote device communicatively coupled to at least one of the member devices. The system also includes an action set execution component configured to execute, in response to the trigger, the automated action set.

In another embodiment, a non-transitory computer-readable medium storing instructions that when executed by a processor perform aspects including selecting a community including member devices, wherein the member devices are associated with a distributed job; identifying a trigger related to the distributed job; spawning an automated action set related to the trigger, wherein the automated action set includes at least one of automated action by the member devices or automated action by a remote device communicatively coupled to at least one of the member devices; and executing, in response to the trigger, the automated action set.

DETAILED DESCRIPTION OF ILLUSTRATIVE EMBODIMENTS

Networks under development will include a variety of communities having members related by the parameters defining community membership. Aspects herein describe means for representing triggers and spawning automated actions in response to those triggers. Actions can vary by community or based on individual personas within a community, and can be orchestrated as a single action or series following an appropriate trigger.

As used herein a "community" is a group of one or more entities related by a parameter. Parameters can include membership criteria, purpose, size, action or behavior permissions, data access, device type, and constraints such as size, activity limits, dates and times for forming, locking (e.g., no further changes to membership or parameters), or disbanding, et cetera. Such entities can be organizations or their authorized representatives, individuals, or devices associated therewith. Entities within a community can have community roles, which provide more or fewer permissions than the standard permission or behavior configuration given to every community member. Communities can also be divided into sub-communities inheriting community rights and parameters or cloned to replicate the rights and parameters of a given community. Existing communities can be modified, either in terms of membership or the other rights or parameters associated therewith. Communities can be dynamic, with changing membership and/or parameters after forming, or static, which remain unchanged after forming or after certain actions occur.

As used herein, a "member device," or more generally any device, can be interpreted as any equipment including communication elements for interacting with a community. In this regard, a device represents an individual or organization within a community. A single device can represent multiple entities based on, e.g., credentials provided inasmuch as multiple individuals may use the same device. Examples of devices can include but are not limited to desktop or mobile computers, mobile phones or mobile assistants, tablet devices, medical equipment, vehicles, smart appliances, smart home components, digital assistants, security systems, monitors or meters, wearable devices (including but not limited to smart watches, fitness trackers, smart glasses, virtual or augmented reality headsets), residential controls, commercial controls, industrial controls, entertainment systems or dongles, delivery and logistics tracking systems, financial systems, et cetera. While devices are generally described as commodity or purpose-built systems including computing elements, a "device" herein can, in embodiments, include an instantiation of a virtual resource or process. For example, a virtual machine or virtualized agent can represent an entity within a community, or otherwise interact with or receive data based on actions spawned related to a community, without departing from the scope or spirit of the innovation.

Where a "member device" is used herein, one or more members can be associated with the member device. In embodiments, devices can be shared among multiple members, and multiple personas can accordingly be stored on, represented by, or otherwise associated with a single device. Further, a single persona can be associated with multiple devices, et cetera. To associate a persona with a device or change personas, various control or authentication may be completed based on the particular use of the device and communities with which the device interacts. In embodiments, control or authentication to utilize a persona may vary by community. For example, a user may use a local device according to their profile, but the device may have limited access to the community based on the community imposing higher authentication standards to leverage a persona associated with the community than the authentication standards to use a local profile on the device. Further, additional authentication or verification techniques can be employed to ensure that a persona is leveraged only by authorized person(s) where a device is shared among person(s) with varying credentials or roles in communities.

As used herein, a "trigger" can be an event of interest to a community or an entity related to the community. Triggers can include a determination that an event is starting, is underway, or is completed. Trigger events can be performed by a community, by an entity within a community, by an entity outside the community, or occur without knowledge of a performing entity. Alternatively or complementarily, triggers can be entity-agnostic, such as those which can be based on a particular time or date, or those which can be based on an unscheduled occurrence (e.g., natural event, accident, spontaneous situation).

As used herein, an "action set" is one or more actions which may be performed in response to a trigger. Action sets can include a single action (e.g., authorize a specific community member access to specific data) or a series of actions (e.g., authorize account data access, authorize modification of account based on data accessed, et cetera).

As used herein, a "distributed job" is a job worked through collective action of a community.

To provide an example environment in which community triggers and spawned actions can be implemented, FIGS. 1-6 illustrate an architecture which can employ such communities. Specifically, FIGS. 1-6 generally illustrate the AT&T enhanced control, orchestration, management and policy platform (ECOMP platform) and related aspects. Many such aspects also apply to the open-source Open Networking Automation Platform (ONAP), which is based on ECOMP. While FIGS. 1-6 illustrate possible environments, these environments will be understood to provide only an example of possible environments and are not required for practice of all embodiments of the disclosure. For example, aspects disclosed herein can be practiced in environments not utilizing central orchestration, and can more generally be flexibly implemented in a variety of open and closed environments.

Figure 1:
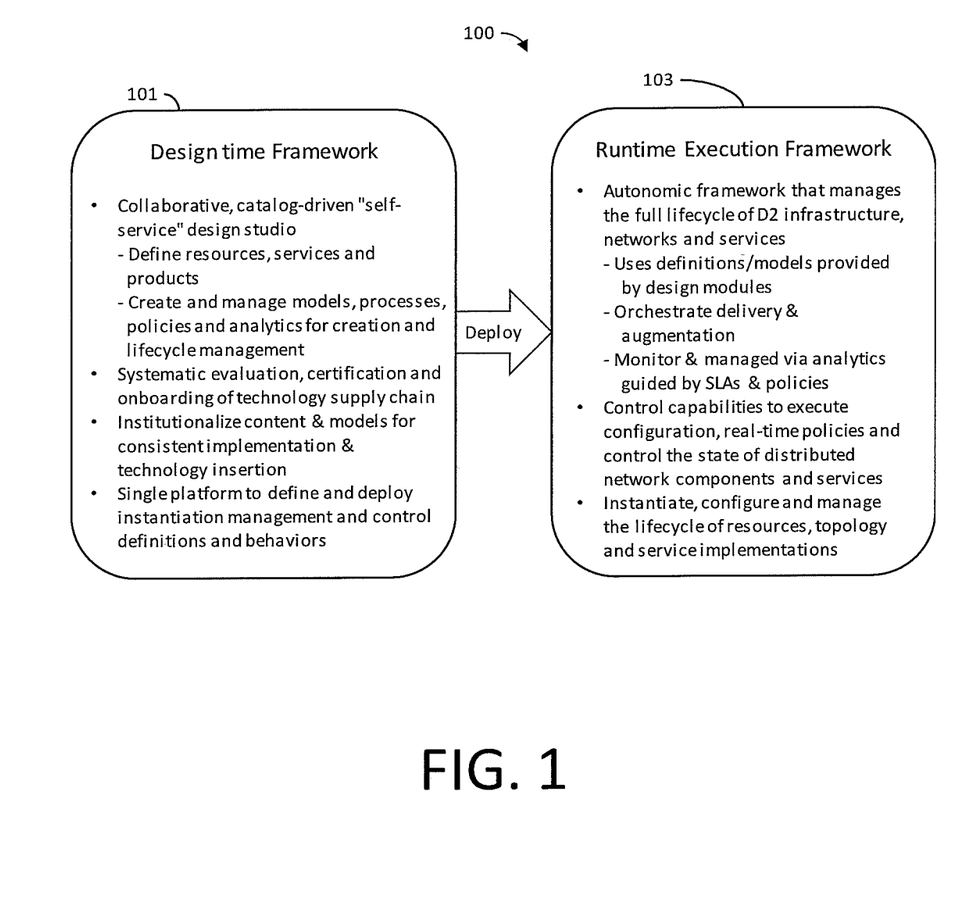
FIG. 1 is a block diagram illustrating the architecture of an enhanced control, orchestration, management and policy platform in which embodiments of the disclosure may be implemented. The embodiment may be implemented in two types of architectures, namely centralized or distributed.

Illustrated in FIG. 1 is a schematic of the architecture of an ECOMP platform 100 that is implemented in a cloud environment. The ECOMP platform 100 includes a design time framework component 101 and a runtime execution framework 103. The cloud environment provides a number of capabilities including real-time instantiation of virtual machines (VMs) on commercial hardware where appropriate; dynamic assignment of application and workloads to VMs; dynamic movement of applications and dependent functions to different VMs on servers within and across data centers in different geographies (within the limits of physical access tiedowns constraints); and dynamic control of resources made available to applications (CPU, memory, storage). With the use of network function virtualization, network appliances can be transformed into software applications. In the integrated cloud environment the dynamic cloud capabilities are applied to applications (i.e., virtual network functions (VNFs)) thus applying the benefits of the cloud environment to virtual network elements. For example, VNFs, such as routers, switches, firewalls, can be "spun up" on commodity hardware, moved from one data center to another center dynamically (within the limits of physical access tie-down constraints) and resources such as CPU, memory and storage can be dynamically controlled.

The ECOMP platform 100 enables the rapid on-boarding of new services and the reduction of operating expenses and capital expenses through its metadata-driven service design and creation platform and its real-time operational management framework—a framework that provides real-time, policy driven automation of management functions. The metadata-driven service design and creation capabilities enable services to be defined with minimal information technology development required thus contributing to reductions in capital expenses. Real-time operational management framework provide significant automation of network management functions enabling the detection and correction of problems in an automated fashion contributing to reductions in operating expenses.

The ECOMP platform 100 enables product/service independent capabilities for design, creation and lifecycle management. The design time framework component 101 is an integrated development environment with tools, techniques, and repositories for defining/describing network assets. The design time framework component 101 facilitates re-use models thus improving efficiency as more models are available for reuse. Assets include models of the cloud environment resources, services and products. The models include various process specifications and policies (e.g., rule sets) for controlling behavior and process execution. Process specifications are used by the ECOMP platform 100 to automatically sequence the instantiation, delivery and lifecycle management aspects of the integrated cloud environment based resources, services, products and the components of the ECOMP platform 100. The design time framework component 101 supports the development of new capabilities, augmentation of existing capabilities and operational improvements throughout the lifecycle of a service. Service design and creation (SDC), policy, and data collection, analytics and events (DCAE) software development kits (SDKs) allow operations/security, 3rd parties (e.g., vendors), and other experts to continually define/refine new collection, analytics, and policies (including recipes for corrective/remedial action) using a design framework portal. Certain process specifications (aka 'recipes') and policies are geographically distributed to many points of use to optimize performance and maximize autonomous behavior in an integrated cloud environment's federated cloud environment.

The runtime execution framework 103 executes the rules and policies distributed by a design and creation environment. This allows for the distribution of policy enforcement and templates among various ECOMP modules (described below). These components advantageously use common services that support logging, access control, and data management.

Figure 2:
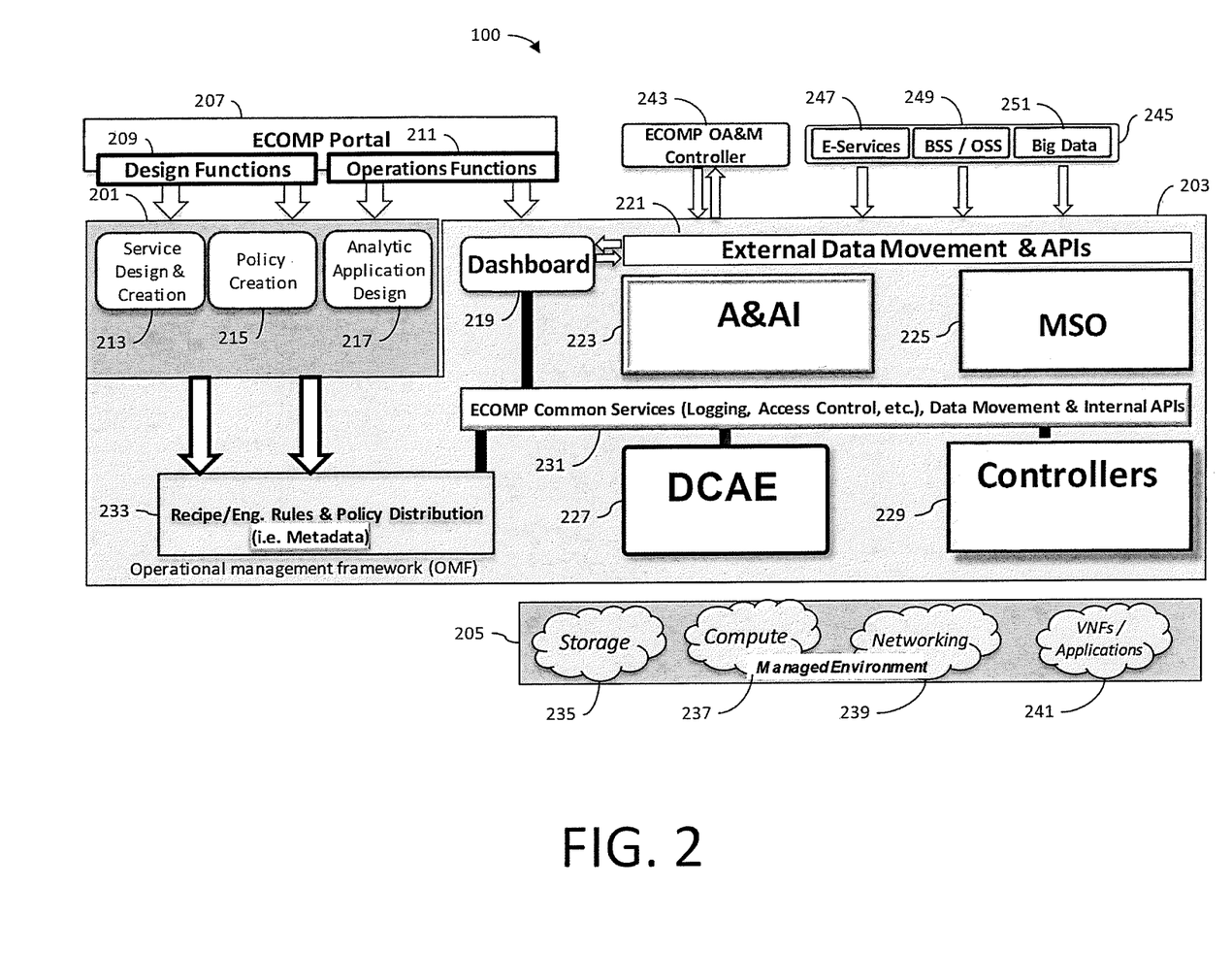
FIG. 2 is a block diagram of a platform for enhanced control, orchestration, management and policy in which embodiments of the disclosure may be implemented.

Illustrated in FIG. 2 are the components of an embodiment of the ECOMP platform 100. The ECOMP platform 100 is provided with three environments. These are the design creation environment 201, the execution environment 203, and the managed environment 205 shown as shaded areas in FIG. 2.

The ECOMP platform 100 includes an ECOMP Portal 207 that provides design functions 209 and operations functions 211. The design functions 209 include a service design and creation component 213 and policy creation component 215. The operations functions 211 include analytic application design component 217 and a dashboard 219. The service design and creation component 213, the policy creation component 215 and analytic application design component 217 are all part of the design creation environment 201. The dashboard is part of the execution environment 203.

In addition to the dashboard 219, the execution environment 203 includes: an external data movement and application program interface component, (API component 221); an active and available inventory module, (A&AI module 223); a master service orchestrator, (MSO 225); a data collection, analytics and events component, (DCAE module 227); controllers 229; a common services component 231; and a recipe/engineering rules and policy distribution component 233.

The managed environment 205 comprises resources, either hardware or software, that may be categorized as: infrastructure resources—(the Cloud resources, e.g., Storage 235, Compute 237); networking resources 239 (network connectivity functions & elements); and VNF/application resources 241 (the features and capabilities of a software application).

Interacting with the execution environment may be an operations, administration and management controller, (OA&M Controller 243); and a number of external applications 245 that may include e-services 247, business support system and operational support systems, (BSS/OSS application 249), and big data services 251 among others.

Figure 3:
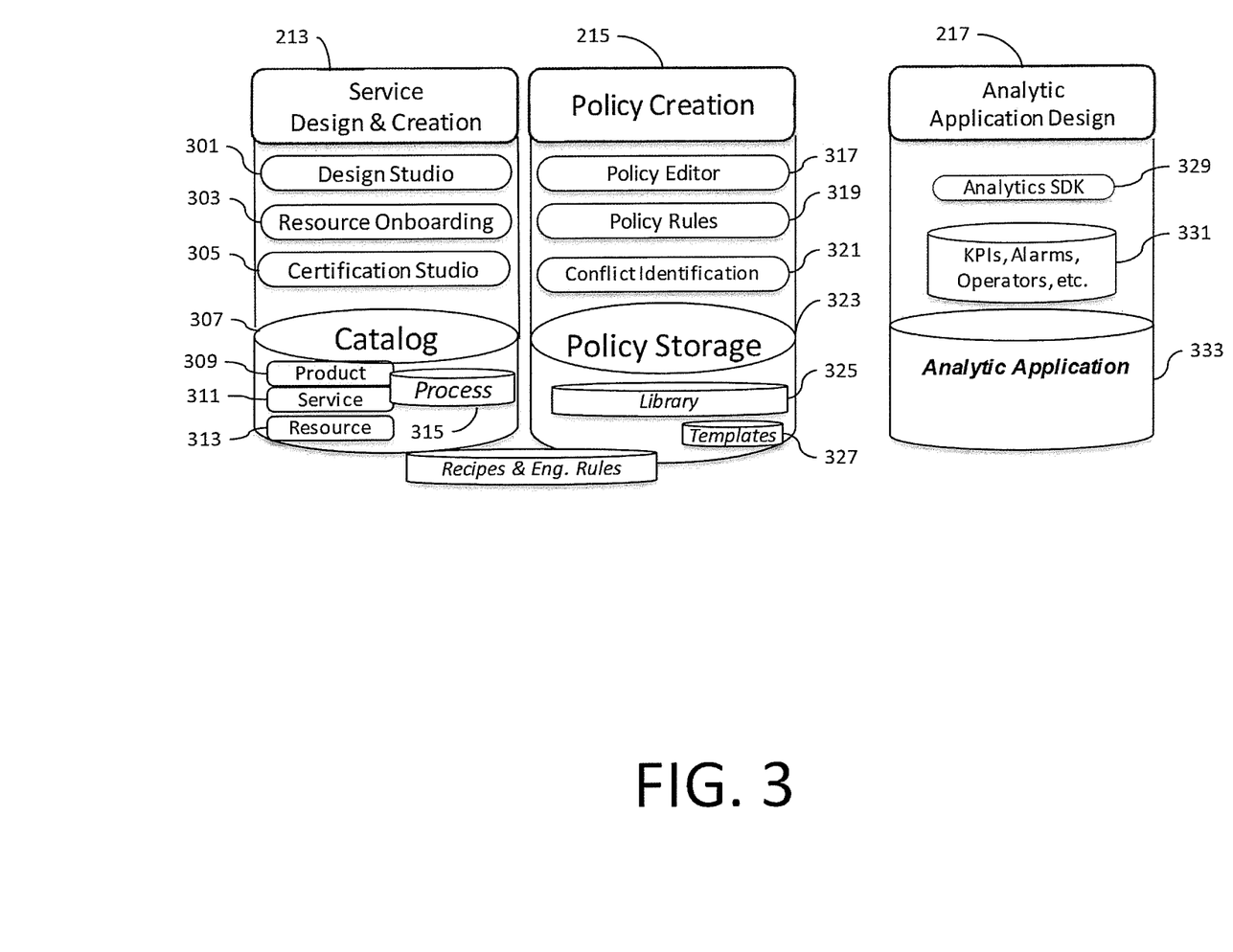
FIG. 3 is a block diagram of the service design and creation component, the policy creation component and the analytic application design component of the platform for enhanced control, orchestration, management and policy.

Illustrated in FIG. 3 are the subcomponents of the service design and creation component 213. The service design and creation component 213 is an integrated development environment with tools, techniques and repositories to define/simulate/certify cloud environment assets as well as their associated processes and policies. The service design and creation component 213 may include a design studio subcomponent 301; a resource onboarding subcomponent 303; a certification studio subcomponent 305; and/or a catalog subcomponent 307. Catalog subcomponent 307 may include information about groups such as products 309, services 311, resources 313 and processes 315.

The policy creation component 215 deals with policies, which are conditions and requirements, constraints, attributes, or needs that must be provided, maintained, and/or enforced. At a lower level the policy creation component 215 involves machine-readable rules enabling actions to be taken based on triggers or requests. Policies often consider specific conditions in effect (both in terms of triggering specific policies when conditions are met, and in selecting specific outcomes of the evaluated policies appropriate to the conditions). Policies allow rapid updates through easily updating rules, thus updating technical behavior of components in which those policies are used, without requiring rewrites of their software code. Policies permit simpler management/control of complex mechanisms via abstraction. The policy creation component 215 may include a policy editor 317; policy rules subcomponent 319; conflict identification subcomponent 321; and/or policy storage subcomponent 323. The policy storage subcomponent 323 may include a library 325 and templates 327.

The policy creation component 215 has a broad scope supporting infrastructure, product/services, operation automation, and security-related policy rules. These policy rules are defined by multiple stakeholders (Network/Service Designers, Operations, Security, customers, et cetera). In addition, input from various sources (service design and creation component 213, policy editor 317, customer input, et cetera) are collected and rationalized. Therefore, a centralized policy creation environment will be used to validate policies rules, identify and resolve overlaps and conflicts, and derive policies where needed. The policy creation component 215 is accessible, developed and managed as a common asset, and provides editing tools to allow users to easily create or change policy rules. Offline analysis of performance/fault/closed-loop action data are used to identify opportunities to discover new signatures and refine existing signatures and closed loop operations. Policy translation/derivation functionality is also included to derive lower level policies from higher level policies. Conflict detection and mitigation are used to detect and resolve policies that may potentially cause conflicts, prior to distribution. Once validated and free of conflicts, policies are placed in an appropriate repository.

After completing initial policy creation or modification to existing policies, the policy distribution component 233 sends policies (e.g., from the repository) to their points of use, in advance of when they are needed. This distribution is intelligent and precise, such that each distributed policy-enabled function automatically receives only the specific policies which match its needs and scope.

Notifications or events can be used to communicate links/URLs for policies to components needing policies, so that components can utilize those links to fetch particular policies or groups of policies as needed. Components in some cases may also publish events indicating they need new policies, eliciting a response with updated links/URLs. Also, in some cases policies can be given to components indicating they should subscribe to one or more policies, so that they receive updates to those policies automatically as they become available.

The analytic application design component 217 includes an analytics software development kit (SDK 329), and storage 331 for key performance indicators (KPIs), alarms, operators, et cetera, as well as storage for analytic application 333.

Figure 4:
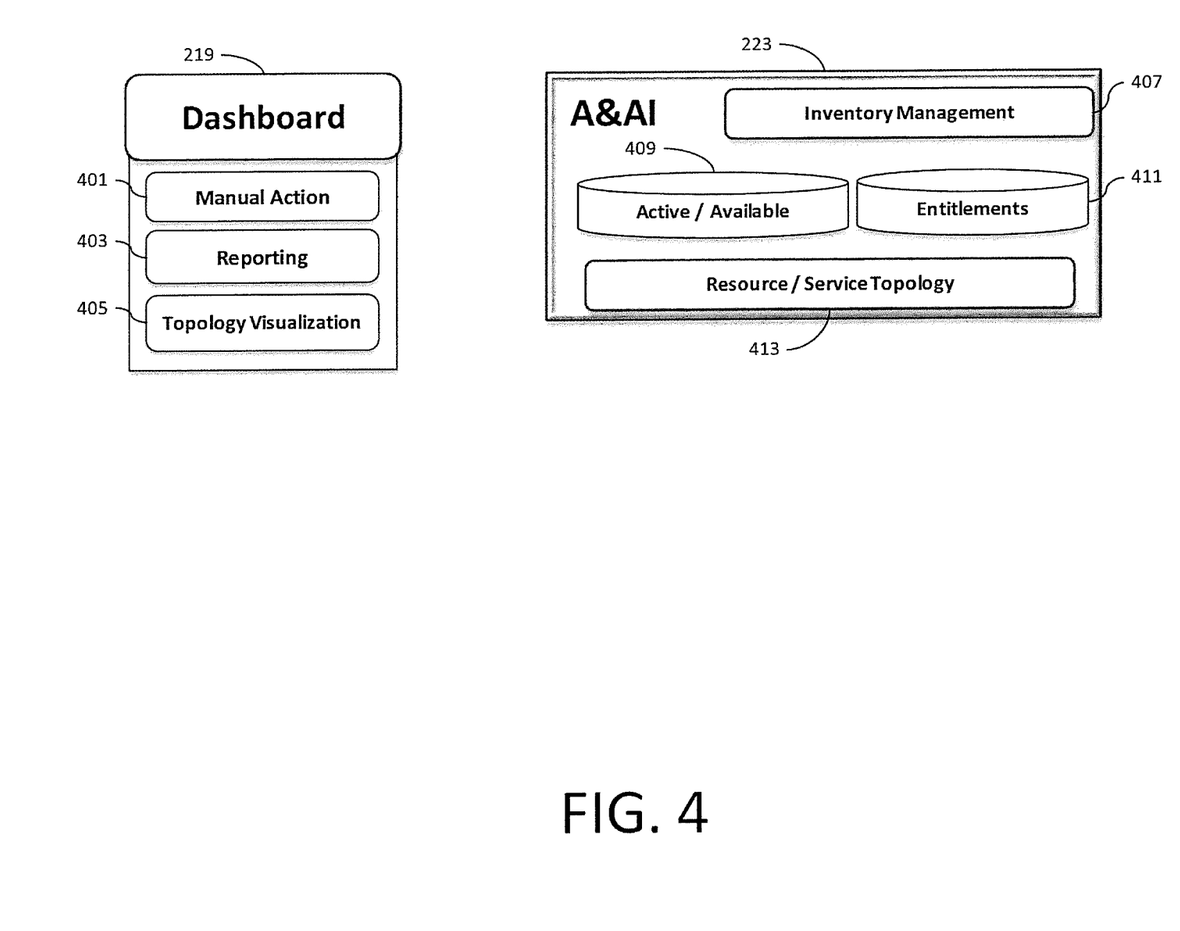
FIG. 4 is a block diagram of the dashboard and active and available inventory module of the platform for enhanced control, orchestration, management and policy.

As shown in FIG. 4, the dashboard 219 includes a manual action subcomponent 401, a reporting subcomponent 403 and a topology visualization subcomponent 405. The dashboard 219 provides access to design, analytics and operational control/administration functions.

The A&AI module 223 is the component that provides real-time views of the resources, services, products and their relationships. The views provided by the A&AI module 223 relate data managed by multiple ECOMP platforms 100, business support systems and operation support systems, (BSS/OSS application 249), and network applications to form a "top to bottom" view ranging from the products customers buy to the resources that form the raw material for creating the products. A&AI module 223 not only forms a registry of products, services, and resources, it also maintains up-to-date views of the relationships between these inventory items. Active and available inventory submodule 409 will manage these multi-dimensional relationships in real-time. The A&AI module 223 is provided with an inventory management submodule 407, an entitlements submodule 411 and a resource/service topology submodule 413.

The inventory management submodule 407 maintains real-time inventory and topology data by being continually updated as changes are made within the integrated cloud. It uses graph data technology to store relationships between inventory items. Graph traversals can then be used to identify chains of dependencies between items. Data views of the A&AI module 223 are used by homing logic during real-time service delivery, root cause analysis of problems, impact analysis, capacity management, software license management and many other integrated cloud environment functions.

The inventory and topology data includes resources, services, products, and customer subscriptions, along with topological relationships between them. Relationships captured by A&AI module 223 include "top to bottom" relationships such as those defined in the service design and creation component 213 and when products are composed of services, and services are composed of resources. It also includes "side to side" relationships such as end to end connectivity of virtualized functions to form service chains. A&AI module 223 also keeps track of the span of control of each controller, and is queried by MSO 225 and placement functions to identify which controller to invoke to perform a given operation.

A&AI module 223 is metadata driven, allowing new inventory item types to be added dynamically and quickly via catalog definitions, reducing the need for lengthy development cycles. A&AI module 223 provides the following key requirements:

Provide accurate and timely views of resource, service, and product inventory and their relationship to the customer's subscription;
Deliver topologies and graphs;
Maintain relationships to other key entities (e.g., location) as well as non-integrated cloud environment inventory;
Maintain the state of active, available and assigned inventory within the ECOMP platform 100;
Allow introduction of new types of Resources, Services, and Products without a software development cycle (i.e., be metadata driven);
Be easily accessible and consumable by internal and external clients;
Provide functional APIs that expose invariant services and models to clients;
Provide highly available and reliable functions and APIs capable of operating as generic cloud workloads that can be placed arbitrarily within the cloud infrastructure capable of supporting those workloads;
Scale incrementally as volumes in the ECOMP platform 100 and cloud infrastructure scales;
Perform to the requirements of clients, with quick response times and high throughput;
Enable vendor product and technology swap-outs over time, e.g., migration to a new technology for data storage or migration to a new vendor for MSO 225 or Controllers 229;
Enable dynamic placement functions to determine which workloads are assigned to specific components of the ECOMP platform 100 (i.e., Controllers 229 or VNFs) for optimal performance and utilization efficiency; and
Identify the controllers 229 to be used for any particular request.

A&AI module 223 also performs a number of administrative functions. Given the model driven basis of the ECOMP platform 100, metadata models for the various catalog items are stored, updated, applied and versioned dynamically as needed without taking the system down for maintenance. Given the distributed nature of the A&AI module 223 as well as the relationships with other components of the ECOMP platform 100, audits are periodically run to assure that the A&AI module 223 is in sync with the inventory masters such as controllers 229 and MSO 225. Adapters allow the A&AI module 223 to interoperate with non-integrated cloud environment systems as well as 3rd party cloud providers via evolving cloud standards.

Consistent with other applications of the ECOMP platform 100, the A&AI module 223 produces canned and ad-hoc reports, integrates with the dashboard 219, publishes notifications other components of the ECOMP platform 100 can subscribe to, and performs logging consistent with configurable framework constraints.

Figure 5:
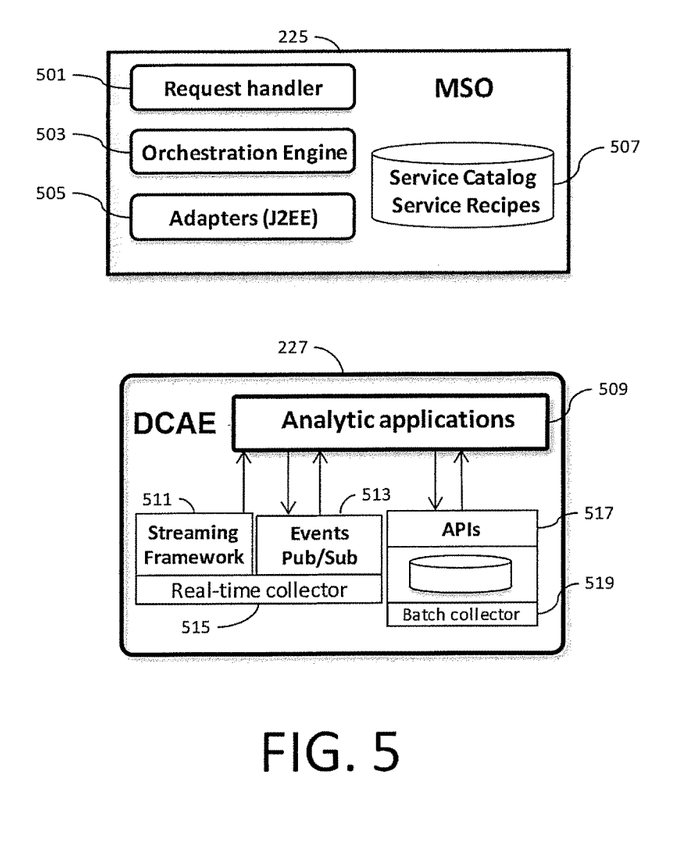
FIG. 5 is a block diagram of the master service orchestrator component and the data collection, analytics and events component of the platform for enhanced control, orchestration, management and policy.

The primary function of MSO 225 is the automation of end-to-end service instance provisioning activities. As shown in FIG. 5, MSO 225 includes a request handler 501, an orchestration engine 503, adapters 505, and service catalog service recipes 507. MSO provides an interface to orchestrate delivery of integrated cloud environment services. In general, orchestration can be viewed as the definition and execution of workflows or processes to manage the completion of a task. The ability to graphically design and modify a workflow process is the key differentiator between an orchestrated process and a standard compiled set of procedural code. Orchestration provides adaptability and improved time-to-market due to the ease of definition and change without the need for a development engagement. As such, it is a primary driver of flexibility in the architecture. Interoperating with policies, the combination provides a basis for the definition of a flexible process that can be guided by business and technical policies and driven by process designers.

Orchestration exists throughout the integrated cloud environment architecture and is not to be limited to the constraints implied by the term "workflow" as it typically implies some degree of human intervention. Orchestration in integrated cloud environment will not involve human intervention/decision/guidance in the vast majority of cases. The human involvement in orchestration is typically performed up front in the design process although there may be processes that will require intervention or alternate action such as exception or fallout processing.

To support the large number of Orchestration requests, the orchestration engine 503 will be exposed as a reusable service. With this approach, any component of the architecture can execute process recipes. Orchestration services will be capable of consuming a process recipe and executing against it to completion. The Service model maintains consistency and reusability across all orchestration activities and ensures consistent methods, structure and version of the workflow execution environment.

As shown in FIG. 5, DCAE module 227 includes an analytic applications module 509, streaming framework 511, an events pub/sub 513, real-time collectors 515, APIs 517 and batch collector 519. In the integrated cloud environment virtualized functions across various layers of functionality are expected to be instantiated in a significantly dynamic manner that requires the ability to provide real-time responses to actionable events from virtualized resources, applications, as well as requests from customers, carrier partners and other providers. In order to engineer, plan, bill and assure these dynamic services, DCAE module 227 within the framework of the ECOMP platform 100 gathers key performance, usage, telemetry and events from the dynamic, multi-vendor virtualized infrastructure in order to compute various analytics and respond with appropriate actions based on any observed anomalies or significant events. These significant events include application events that lead to resource scaling, configuration changes, and other activities as well as faults and performance degradations requiring healing. The collected data and computed analytics are stored for persistence as well as use by other applications for business and operations (e.g., billing, ticketing). More importantly, the DCAE module 227 has to perform a lot of these functions in real-time.

DCAE module 227 provides real-time collectors 515 necessary to collect the instrumentation made available in the integrated cloud infrastructure. The scope of the data collection includes all of the physical and virtual elements (compute, storage and network) in the integrated cloud infrastructure. The collection includes the types of events data necessary to monitor the health of the managed environment, the types of data to compute the key performance and capacity indicators necessary for elastic management of the resources, the types of granular data (e.g., flow, session and call records) needed for detecting network and service conditions, et cetera The collection will support both real-time streaming as well as batch methods of data collection.

DCAE module 227 needs to support a variety of applications and use cases ranging from real-time applications that have stringent latency requirements to other analytic applications that have a need to process a range of unstructured and structured data. DCAE module 227 needs to support all of these needs and must do so in a way that allows for incorporating new storage technologies as they become available. This may be done by encapsulating data access via APIs and minimizing application knowledge of the specific technology implementations.

Given the scope of requirements around the volume, velocity and variety of data that DCAE module 227 needs to support, the storage may use technologies that Big Data has to offer, such as support for NOSQL technologies, including in-memory repositories, and support for raw, structured, unstructured and semi-structured data. While there may be detailed data retained at the edge layer of DCAE module 227 for detailed analysis and trouble-shooting, applications may optimize the use of bandwidth and storage resources by ensuring they propagate only the required data (reduced, transformed, aggregated, et cetera) for other analyses.

The DCAE module 227 includes an analytic framework which is an environment that allows for development of real-time applications (e.g., analytics, anomaly detection, capacity monitoring, congestion monitoring, alarm correlation et cetera) as well as other non-real-time applications (e.g., analytics, forwarding synthesized or aggregated or transformed data to Big Data stores and applications); the intent is to structure the environment that allows for agile introduction of applications from various providers (Labs, IT, vendors, et cetera). The framework supports the ability to process both a real-time stream of data as well as data collected via traditional batch methods. The analytic framework supports methods that allow developers to compose applications that process data from multiple streams and sources. Analytic applications are developed by various organizations, however, they all run in the DCAE module 227 and are managed by a DCAE controller (not shown). These applications are microservices developed by a broad community and adhere to the standards of the ECOMP platform 100.

The following list provides examples of types of applications that can be built on top of DCAE module 227 and that depend on the timely collection of detailed data and events by DCAE module 227. Analytics applications will be the most common applications that are processing the collected data and deriving interesting metrics or analytics for use by other applications or operations. These analytics range from very simple ones (from a single source of data) that compute usage, utilization, latency, et cetera to very complex ones that detect specific conditions based on data collected from various sources. The analytics could be capacity indicators used to adjust resources or could be performance indicators pointing to anomalous conditions requiring response. The Fault/Event Correlation application is a key application that processes events and thresholds published by managed resources or other applications that detect specific conditions. Based on defined rules, policies, known signatures and other knowledge about the network or service behavior, this application would determine root cause for various conditions and notify interested applications and operations. A performance surveillance and visualization application provides a window to operations notifying them of network and service conditions. The notifications could include outages and impacted services or customers based on various dimensions of interest to Operations. They provide visual aids ranging from geographic dashboards to virtual information model browsers to detailed drilldown to specific service or customer impacts. The capacity planning application provides planners and engineers the ability to adjust forecasts based on observed demands as well as plan specific capacity augments at various levels, e.g., network functions virtualization infrastructure (NFVI) level (technical plant, racks, clusters, et cetera), Network level (bandwidth, circuits, et cetera), Service or Customer levels. A testing and trouble-shooting application provides operations the tools to test and trouble-shoot specific conditions. They could range from simple health checks for testing purposes, to complex service emulations orchestrated for troubleshooting purposes. In both cases, DCAE module 227 provides the ability to collect the results of health checks and tests that are conducted.

These checks and tests could be done on an ongoing basis, scheduled or conducted on demand. Some components of integrated cloud environment may expose new targets for security threats. Orchestration and control, decoupled hardware and software, and commodity hardware may be more susceptible to attack than proprietary hardware. However, software defined networks (SDN) and virtual networks also offer an opportunity for collecting a rich set of data for security analytics applications to detect anomalies that signal a security threat, such as distributed denial of service (DDoS) attack, and automatically trigger mitigating action. The applications that are listed above are by no means exhaustive and the open architecture of DCAE module 227 will lend itself to integration of application capabilities over time from various sources and providers.

Figure 6:
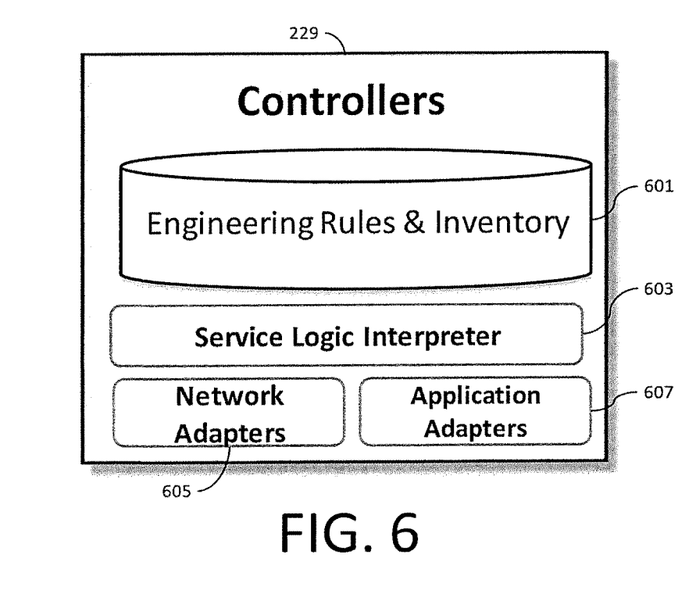
FIG. 6 is a block diagram of the components for the controllers of the platform for enhanced control, orchestration, management and policy.

Illustrated in FIG. 6 are the components of the controllers 229. Controllers 229 include an engineering rules and inventories module 601, a service logic interpreter module 603; a network adapter module 605, and an application adapter module 607. Controllers are applications which are intimate with cloud and network services and execute the configuration, real-time policies, and control the state of distributed components and services.

ECOMP platform 100, as described in FIGS. 1-6, can be modified for alternative implementations of a "network operating system" for software-defined networks, such as the Open Networking Automation Platform (ONAP). ONAP is an open-source architecture and as such presents additional complexity and programming variance into the environment.

Whether in ECOMP, ONAP, or other environments, development for software-defined networks presents challenges relating to the use of disparate languages and models. The distributed nature and mixture of commodity, enterprise, and other clouds makes cross-platform collaboration and integration, including, e.g., use and reuse of information and data types, relationship and dependency management, and data graph generation impossible with existing data dictionaries or converters. Laborious manual management of cross-references is also limited by the exposure and comprehension of developers and cannot auto-update to modify relationships or ensure that relationships are properly updated before data or data types are deleted.

Figure 7:
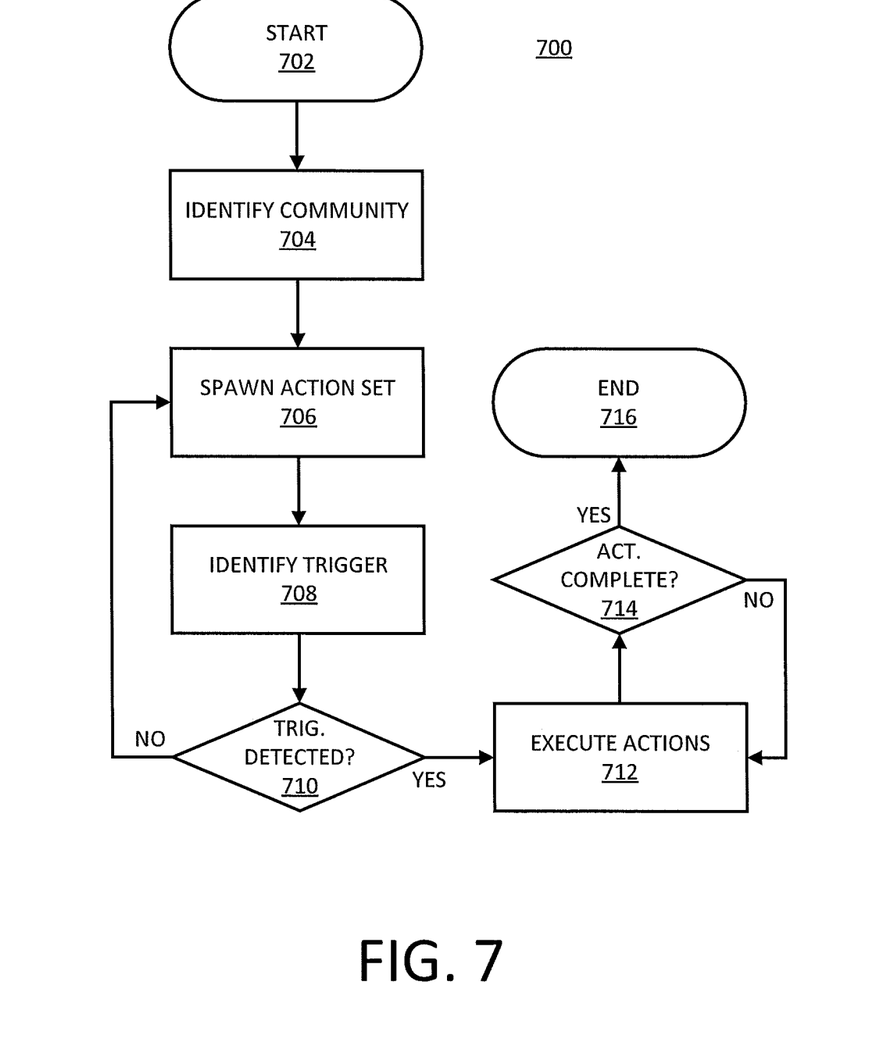
FIG. 7 is an example flow chart of an embodiment of a method for spawning actions related to a community.

FIG. 7 illustrates an example methodology 700 for spawning community actions in response to a trigger. Methodology 700 begins at 702 and proceeds to 704 where a community is identified. In embodiments, identifying a community can include selecting a community including member devices. In embodiments, the member devices can be associated with a distributed job. The community can be formed for performance of the distributed job. In alternative or complementary embodiments, the member devices can be joined to a community based on the identification of users, geolocation, device type, organizational association, et cetera, and may be joined for purposes other than performance of a distributed job. Information sharing, data collection, multi-entity equation solving (e.g., determine best travel routes for related or unrelated entities to coordinate traffic flows), and other functions can be served by community parameters where the entities of the community do not work together or in common toward a specific job, job function, or group of jobs.

Identification of a community can also include determining one or more community roles associated with each of the member devices, although this can also be performed at other aspects of methodology 700. Roles can relate to specific permissions within a community or how the community or associated actions behave with respect to a particular member. In an embodiment, the one or more community roles associated with one of the member devices are based on association of the one of the member devices with a separate community.

Parameters related to communities can define membership criteria. In an embodiment, a member device among the member devices is added or removed from the community based on a current location. This can be performed during formation of the community, or can be an automated community action whereby locations of one or more devices comprise triggers (e.g., device entering or leaving locations or ranges as a trigger).

In an embodiment, a community is expired but can be identified and recalled based on rework or repetition of a distributed job. For example, if a technician performs a complex equipment installation requiring coordination with a vendor, the community may be retired following installation. One year later, when the customer desires technical modification of the system, the same community may be identified and recalled to leverage the specialized knowledge possessed by the same technician and vendor personnel.

At 706, an action set is identified. The action set defines one or more actions taken in response to a trigger. In embodiments, there can be two or more triggers related to an action set, or two or more action sets can be related to a trigger (e.g., both executed on trigger, one or more executed based on trigger variables or other triggers). Identification of an action can include spawning an automated action set related to the trigger. The automated action set can include at least one of automated action by the member devices or automated action by a remote device communicatively coupled to at least one of the member devices.

In embodiments, identification of the action set at 706 can include modifying a standard action set based on a persona associated with at least one of the member devices, wherein the automated action set is spawned from modification of the standard action set. In this way, action sets applicable to multiple communities or events can be tailored to the specific community (or entity within the community) or events. Other modifications can be pursued, and action sets can "evolve" over time based on feedback regarding their success or problems. For example, if a bottleneck is identified that is slowing an otherwise speedy action set (e.g., manual approval before proceeding), additional automated action may be arranged to avoid the bottleneck. However, if an error rate associated with an automated aspect of an action set grows too high, the action can be modified to correct for the undesired behavior.

In some embodiments, a standard action set can be associated with one or more triggers, and an action set can be identified as a subset or modification of the standard action set.

Action sets can include a variety of actions or functions. In an example, an action set or portion thereof can include granting one or more of the member devices conditional access to a portion of information related to the distributed job. In this regard, methodology 700 and other aspects of the disclosure can automate role-based access control (RBAC) to expedite the information needed to complete jobs without bottlenecking access requests at a manual approver. User roles can depend on assignments within a community or a user persona, which can include history about affiliation with prior communities and earlier action. Personas can include common features linking to a community and unique features particular to the persona, on which roles can be based to provide users unique permissions or experiences within a largely automated community. Further, roles (as well as triggers and action sets) can vary based on the current state of a community (e.g., number of administrators varies with community size or age, data provided to or collected from member devices varies by location).

In another example, an action set or a portion thereof can include one of adding a new member device or removing at least one of the member devices. In a related example, an action set or a portion of an action set can add or remove a member device from the community based on a persona associated with the member device. Alternatively such aspects can be performed during forming of the community.

In another example, an action set or portion thereof can include transmitting the portion of information related to the distributed job to at least one of the member devices based on the one or more community roles. This can include disseminating information, updating a task list or task state, sending notifications, et cetera.

In still another example, an action set or a portion thereof can include forming, as a part of the automated action set, a sub-community in response to the trigger. In such embodiments, the sub-community may inherit one or more rights associated with the community. Other aspects, such as parameters, membership, et cetera, can also be inherited. In an embodiment, a parent community from which child communities are formed can allow some or all operational data, in addition to parameters, to be cloned and made available in child communities.

In another example, an action set or a portion thereof can include modifying, as a part of the automated action set, the community in response to the trigger. In yet another example, an action set or a portion thereof can include modifying, as a part of the automated action set, a persona associated with at least one of the member devices in response to the trigger.

Action sets can be configured to abide rules, regulations, and laws. Laws regarding personally identifiable information (PII), personal health information (PHI), and other data or privacy regulations can be developed into triggers and action sets to prevent misunderstanding, spillage, or breaches that could occur through human action or inaction.

Action sets can further provide security solutions. For example, unusual network traffic or unexpected access patterns can trigger community action automatically and manually investigate suspicious activity. Physical security can also be imposed; for example, unusual movement patterns could cause cameras or sensors to remain on for longer periods of time, notify guards or users, or control facility devices to secure a premises or stop sensitive processes.

Action sets can further interact with or modify other communities or sub-communities in response to a trigger. For example, a scheduled trigger could cause communities possessing similar information to exchange data to add to a statistical set for automation refinement.

A community-to-community action can be performed as part of an action set. For example, where a first member of a first community having a first role is tasked but cannot timely perform the task, a notification can be provided to a second community comprising all active community members holding the first role who may be available to advance the process in the first community on behalf of the first member.

At 708, a trigger can be identified, on occurrence of which one or more spawned action sets are executed. In an example, a trigger can include a new device joining the community (e.g., triggering an action set that notifies community members and assigns permissions to the new device). Triggers can relate to a variety of events or inferences, and many are discussed above and hereafter in reference to the action sets occurring in response to a trigger.

In an embodiment, user sentiment can be utilized as a trigger. For example, where a user is dissatisfied or frustrated, the actions or tasks occurring may be elevated to a higher level for more rapid handling and restoration of positive sentiment.

In an embodiment, a persona on a member device can be used as a trigger. For example, multiple people (or multiple accounts associated with a single person) may be utilized one a common device (e.g., notebook computer storing multiple credentials). With respect to a device or group of devices, the presence or absence of one or more personas, switching of profiles or personas, authentication to or logout from a persona, time spent logged into or idle with a persona, et cetera, can all be defined as triggers on which community action sets may be based.

At 710, a determination is made as to whether a given trigger is detected. If a trigger is not detected, methodology 700 may pause awaiting detection of the trigger or recycle to, e.g., 706 where action sets are spawned for the community in embodiments where action sets are not static and may change over time or based on other variables.

If the determination at 710 returns positive, methodology 700 proceeds to 712 where the spawned action set is executed, in its entirety or in a step-wise or piecemeal manner based on sequencing or additional triggers. Thereafter, at 714 a determination is made as to whether the action set is complete. If not, methodology 700 can return to 712 to continue execution. If so, methodology 700 proceeds to end at 716, or may recycle to any other point in the methodology (e.g., identifying a new community, action sets, triggers, et cetera).

Figure 8:
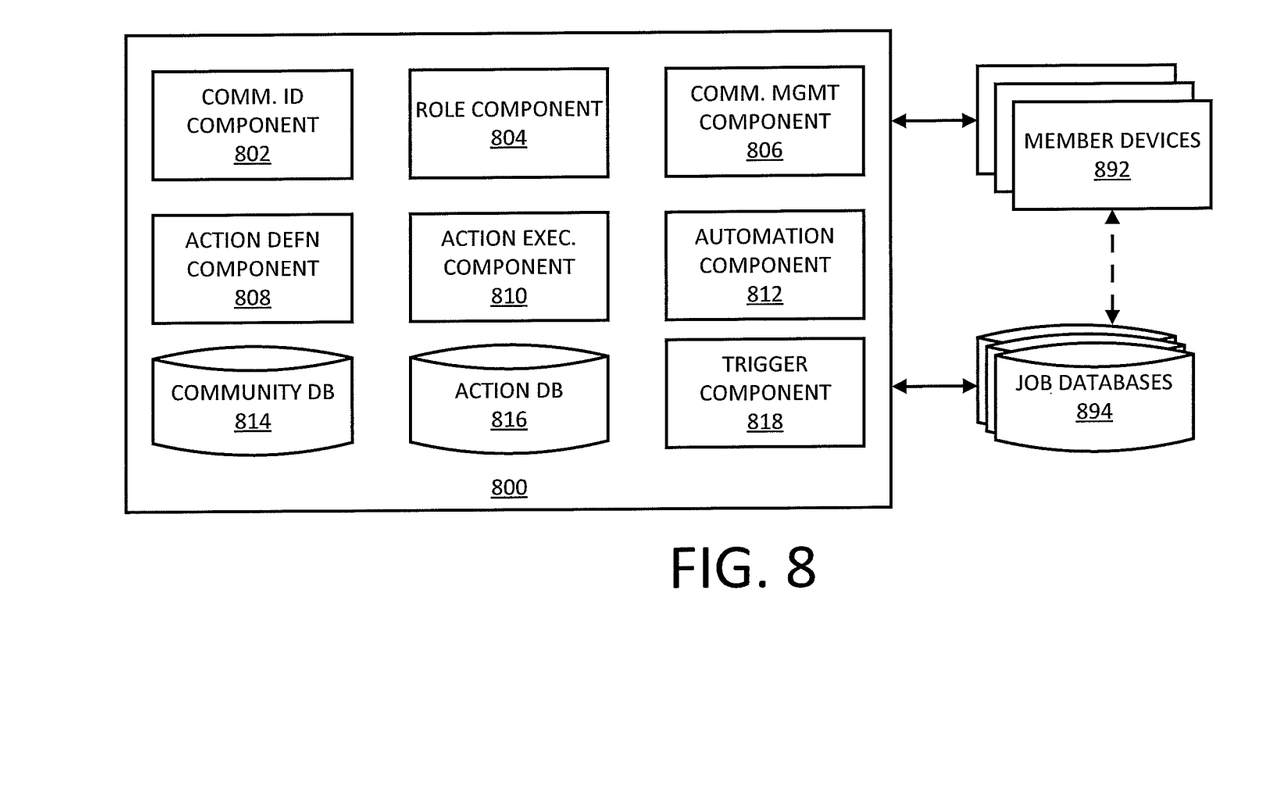
FIG. 8 is an example block diagram of a system for spawning actions related to a community.

FIG. 8 illustrates example block diagram of a community action system 800 for spawning actions related to a community. Community action system 800 includes community identification component 802, role component 804, community management component 806, action set definition component 808, action set execution component 810, automation component 812, community database 814, action database 816, and trigger component 818. Further, member devices 892 and job databases 894 interact with community action system 800. In embodiments, job databases 894 can be partially or wholly within community action system 800. In embodiments, member devices 892 can communicate with job databases 894 through community action system 800. In alternative or complementary embodiments, community action system 800 can authorize one or more of member devices 892 to communicate directly with one or more of job databases 894.

Community identification component 802 is configured to select a community including member devices, wherein member devices are associated with a distributed job. Trigger component 818 is configured to identify a trigger related to the distributed job. Automation component 812 is configured to spawn an automated action set related to the trigger. The automated action set includes at least one of automated action by the member devices 892 or automated action by a remote device communicatively coupled to at least one of the member devices 892. Action set execution component 810 is configured to execute, in response to the trigger, the automated action set.

Role component 804 can be configured to determine one or more community roles associated with each of the member devices. Community management component 806 can be configured to modify at least one community in response to the trigger. Action set definition component 808 can be configured to modify a standard action set based on a persona associated with at least one of the member devices 892, wherein the automated action set is spawned from modification of the standard action set.

Community database 814 can be configured to store information related to the community (e.g., parameters for membership, rules, operation data, relationships to other communities, et cetera). Action database 816 can be configured to store one or more action sets and associated triggers.

Several use cases are described hereafter. Such use cases are not deemed to be limiting, but rather intended to provide working examples of methodologies and systems disclosed herein in operation. Those of ordinary skill in the art will appreciate other applications for spawning community based action sets executed according to triggers as disclosed herein which do not diverge from the scope of the innovation.

In a first example, a community can include an internet service provider organization. The organization receives jobs to install or modify lines to or receivers for homes and businesses receiving internet service. A first action set can include initiating a new job. On receipt of a trigger indicating a new job, a sub-community can be formed including the customer service representatives, technicians, and managers based on market responsibilities and availability. On formation or receipt of other triggers, roles can be assigned for community members (e.g., manager with approval authority, technician with limited access to view and modify customer information, customer service representative with full-time account information but no approval authority for contract variances or fee waiving). These roles can provide static or dynamic permissions and authority to advance processes for completing the distributed job (e.g., install a new hard-wired internet connection in a business location). Entry of payment information by the customer service representative can trigger an action set adding physical installation to the technician schedule. At that time and based on the geolocation of devices carried by the technician, technician permissions and authority can be temporarily increased to streamline the installation process, avoiding bottlenecks that occur when technicians must call back to other community members to effect changes beyond their scope of authority. For example, it may be undesirable to provide all technicians access and authority to modify all accounts at any time, but useful to provide this capability when the technician is on the premises of a particular account. Further, technicians may better accommodate customers by providing on-site service outside normal business hours. Triggers for varying levels of access or authority can include technician information (e.g., certifications, experience level, et cetera), and customer information (e.g., services required, schedule, service level). Triggers can also indicate that additional help or expertise is needed, which initiate action sets to notify and add new members to the community. Once the technician completes the job, a successful connection test can provide a trigger for a departure and follow-up action set, and the physical departure of the technician as tracked by geolocation can trigger action sets relating to updating scheduling, logging productivity, et cetera. The community can also be retired in response to job completion triggers, either immediately or after subsequent triggers (e.g., collection of customer feedback, tolling of a period of time). Revocation of remaining permissions and securing of data can occur during community retirement action sets.

In the example above, a community could include, as members or member information, the technician and an associated persona, a customer and an associated persona, an advanced technician and an associated persona, a customer service representative and an associated persona, and a manager and associated persona. Personas can include personal information, personalized workflows or task lists, authentication information, certification and experience information, account information, and temporary credentials relating specifically to the community. The community can include persona rules, databases relating to the distributed job and personas, tasking or assignment databases for assigning or attributing actions, as well as databases storing statistical information from similar or retired communities.

In another example, healthcare providers can be selectively authorized to share sensitive patient data to facilitate transitions between providers and expedite patient coverage. Communities can involve different health systems, healthcare networks, and insurers, with smaller communities or sub-communities built around individual patients and their families or representatives. Community members can include healthcare providers, patients, patient relations, healthcare administrators or service support (e.g., risk management, legal), pharmacies, insurance companies, et cetera. Triggers can include referrals, prescriptions, orders, scheduling, transfers, the start or completion of a medical procedure, and other medical events. Action sets can include selectively allowing access to medical records, transmitting imagery or other information collected using member devices, automating treatment (e.g., providing intravenous medicine to a hospital patient), submitting information for insurance claims, et cetera.

The preceding example can also extend into insurance processing and other payroll or billing examples. Clients or customers can join communities with service providers and vendors along with payment processing and collections entity to streamline automated billing and payment for non-recurring costs or without permanently storing payment information outside payor personas or accounts. Triggers can include approval of an engagement, request for retainer, beginning of work, completion of work, exhaustion of a retainer, time since billing, et cetera, and action sets can include processing a payment, sending a notification or reminder, generating an invoice, refunding a payment, initiating a collections process, et cetera.

In another example, collaborative efforts can be facilitated. For example, member devices can detect geolocation to determine meeting attendance to trigger action sets which selectively disseminate meeting information to attendees or non-attendees.

In another example, unrelated entities driving roads (e.g., delivery companies, livery drivers, commuters) can share data as a travel community using navigation applications to improve traffic flow. Triggers can include congestion levels, accidents, construction, delays, stoplight timing, special events, et cetera, and action sets can involve routing or re-routing traffic to actively and collectively coordinate arrival times (as opposed to re-routing for individual performance).

In another example, devices within a range of one another can share information and notifications to develop geolocation-based information. For example, mobile devices or smart home devices in close proximity (estimating, e.g., the same apartment building) can share information such as power connection and charge status, internet connectivity, temperature, noise levels, information regarding vibration or shaking, et cetera. Events which can be corroborated from a nearby community of devices can be inferred triggers to prompt action sets. For example, decreasing charge status with no device charges could trigger an inference of a power outage, and a loss of connectivity or switch to mobile networks could trigger an inference of a network outage. Rising temperature up to a first threshold could indicate an inferred trigger of problems with an air conditioning unit, and up to a second threshold could indicate a fire. Resulting action sets could call technicians, utilities, building operations personnel, or emergency personnel.

In another example, a community of communities can be formed and leverage artificial intelligence to improve community functioning, triggers, and action sets. Members of such communities can be virtualized agents representative of communities or the community data itself (e.g., databases storing information regarding active and/or retired communities).

As described above, the example embodiments can be in the form of processor-implemented processes and devices for practicing those processes, such as a server in a regional network or cloud data center. The example embodiments may be embodied as either centralized hardware and software or distributed hardware and software. The example embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the example embodiments. The example embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and/or executed by a computer, the computer becomes an device for practicing the example embodiments. When implemented on a general-purpose microprocessor, the computer program code segments configure the microprocessor to create specific logic circuits.

While the disclosure has been described with reference to example embodiments, it will be understood by those skilled in the art that various changes may be made and equivalents may be substituted for elements thereof without departing from the scope of the innovation. In addition, many modifications may be made to adapt a particular situation or material to the teachings of the disclosure without departing from the essential scope thereof. Therefore, it is intended that the innovation not be limited to the particular embodiments disclosed for carrying out this innovation, but that the innovation will include all embodiments falling within the scope of the claims. Moreover, the use of the terms first, second, et cetera, do not denote any order or importance, but rather the terms first, second, et cetera, are used to distinguish one element from another. Furthermore, the use of the terms a, an, et cetera, do not denote a limitation of quantity, but rather denote the presence of at least one of the referenced item.

What is claimed is:

1. A computer-implemented method, comprising:
    selecting a community including member devices, wherein the member devices are associated with a distributed job, wherein the member devices include mobile devices in proximity;
    sharing, with the community, information of one or more member devices, the information of the one or more member devices includes power connection, charge status, and internet connectivity;
    identifying, based on the shared information, a trigger related to the distributed job;
    spawning an automated action set related to the trigger, wherein the automated action set includes at least one of automated action by the member devices or automated action by a remote device communicatively coupled to at least one of the member devices; and
    executing, in response to the trigger, the automated action set, wherein the automated action set includes sending an alert.

2. The computer-implemented method of claim 1, wherein the identifying, based on the shared information, the trigger comprises detecting a decrease in charge status by the member devices that include mobile devices with respective power connections; and
    based on the trigger, indicating in the alert that a power outage has occurred.

3. The computer-implemented method of claim 1, wherein the information further comprises temperature, noise levels, and information regarding vibration or shaking.

4. The computer-implemented method of claim 3, further comprising:
    determining one or more community roles associated with each of the member devices.

5. The computer-implemented method of claim 4, further comprising:
    transmitting the portion of information related to the distributed job to at least one of the member devices based on the one or more community roles.

6. The computer-implemented method of claim 4, wherein the one or more community roles associated with one of the member devices are based on association of the one of the member devices with a separate community.

7. The computer-implemented method of claim 1, further comprising:
    forming, as a part of the automated action set, a sub-community in response to the trigger.

8. The computer-implemented method of claim 7, wherein the sub-community inherits one or more rights associated with the community.

9. The computer-implemented method of claim 1, wherein the community is dynamic and the member devices are represented in part by a virtual machine or virtualized agent.

10. The computer-implemented method of claim 9, wherein a member device among the member devices is added or removed from the community based on a current location.

11. The computer-implemented method of claim 9, wherein a member device among the member devices is added or removed from the community based on a persona associated with the member device.

12. The computer-implemented method of claim 1, further comprising:
    modifying a standard action set based on a persona associated with at least one of the member devices, wherein the automated action set is spawned from modification of the standard action set.

13. The computer-implemented method of claim 1, further comprising:
    detecting a new device joining the community, wherein the trigger is the new device joining the community.

14. The computer-implemented method of claim 1, further comprising:
modifying, as a part of the automated action set, the community in response to the trigger.

15. The computer-implemented method of claim 1, wherein the detected trigger for the first threshold is an indication of an air condition malfunction.

16. A system, comprising:
one or more processors; and
memory coupled with the one or more processors, the memory storing executable instructions that when executed by the one or more processors cause the one or more processors to effectuate operations comprising:
selecting a community including member devices, wherein the member devices are associated with a distributed job, wherein the member devices include mobile devices in proximity;
sharing, with the community, information of one or more member devices, the information of the one or more member devices includes power connection, charge status, and internet connectivity;
identifying, based on the shared information, a trigger related to the distributed job;
spawning an automated action set related to the trigger, wherein the automated action set includes alerting a device associated with a building operations personnel or an emergency personnel; and
executing, in response to the trigger, the automated action set, wherein the automated action set includes sending an alert.

17. The system of claim 16, wherein the member devices include mobile devices or smart home devices in close proximity.

18. The system of claim 17, further comprising:
a community management component configured to modify at least one community in response to the trigger.

19. The system of claim 16, further comprising:
an action set definition component configured to modify a standard action set based on a persona associated with at least one of the member devices, wherein the automated action set is spawned from modification of the standard action set.

20. A non-transitory computer-readable medium storing instructions that when executed by a processor perform aspects including:
selecting a community including member devices, wherein member devices are associated with a distributed job, wherein the member devices include mobile devices in proximity;
sharing, with the community, information of one or more member devices, the information of the one or more member devices includes power connection, charge status, and internet connectivity;
identifying, based on the shared information, a trigger related to the distributed job, wherein the trigger includes a traffic congestion level associated with a member device of the member devices, a traffic accident associated with the member devices, a traffic delay associated with a member device, or stoplight timing, wherein the member device is associated with a vehicle;
spawning an automated action set related to the trigger, wherein the automated action set includes at least one of automated action by the member devices or automated action by a remote device communicatively coupled to at least one of the member devices; and
executing, in response to the trigger, the automated action set, wherein the automated action set includes sending an alert.

* * * * *